Figure 1:
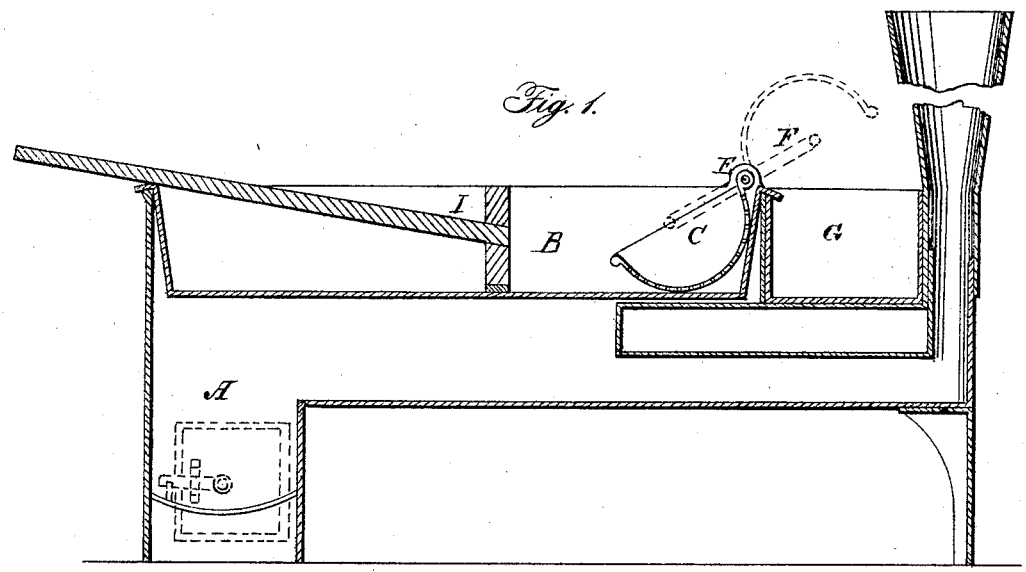
Figure 2:
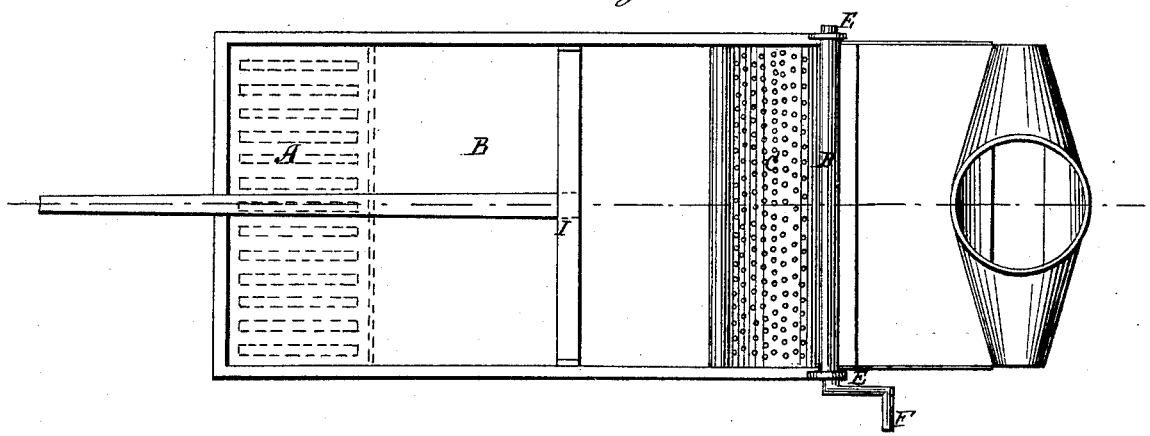

UNITED STATES PATENT OFFICE.

HAYDN M. BAKER, OF ROCHESTER, NEW YORK.

IMPROVEMENT IN THE MANUFACTURE OF BICARBONATE OF SODA AND POTASH AND HYDROCHLORIC ACID.

Specification forming part of Letters Patent No. 57,458, dated August 28, 1866.

*To all whom it may concern:*

Be it known that I, HAYDN M. BAKER, of Rochester, in the county of Monroe and State of New York, have invented a new and useful Process for the Manufacture of Carbonates and Bicarbonates of Soda or Potash and Muriatic Acid from the Chlorides of Potassium and Sodium; and I hereby declare that the following is a full and exact description thereof.

The nature of my invention consists in and depends upon the high degree of affinity of silicic acid at very elevated temperatures, and the corresponding low degree of affinity of said acid at common or limited temperatures, for alkalies and bases.

The said invention also consists in the double decomposition of the alkaline chlorides with nitrate of lead and the recovery of the lead-nitrate by saturating the oxide of lead with nitric acid evolved during the process of fluxing the nitrate alkali with silicic acid, (sand,) the said lead-oxide being obtained by decomposing the chloride of lead (formed during double decomposition of the alkaline chloride and lead-nitrate) with oxide of magnesium, (magnesia.)

It further consists in recovering the magnesia by distilling the chloride of magnesium, giving rise to magnesia and muriatic acid.

It furthermore consists in the decomposition of the soluble silicate of soda or potash by saturation with carbonic acid of any degree of pressure, (the said alkaline silicate.)

To enable others skilled in the chemical art to make use of my invention, I will proceed to describe it more particularly.

The whole operation may be conducted in any well-established glass manufactory by providing the same with suitable tanks and a still for the distillation of the muriatic acid and recovery of magnesia from the chloride of magnesium. The reactions of potassium and sodium chlorides by these processes are the the same. It therefore is only necessary to describe one—namely, chloride of sodium.

*First process.*—I make equivalent solutions of chloride of sodium (common salt) and nitrate of lead, and mix said solutions together in appropriate apparatus; double decomposition occurs, chloride of lead and nitrate of soda forming, the former precipitating, the latter remaining in solution. The solution of nitrate may now be separated by any convenient method from the chloride of lead (precipitated) and evaporated in any suitable vessel to the crystallizing-point of nitrate of soda, and then run off into crystallizing-pans and cooled. When crystallization takes place, the crystals may be collected and dried for another process, and the uncrystallized solution may be returned to the evaporating-pan and boiled with the succeeding productions of nitrate-of-soda solution designed for crystallization, all the succeeding operations of nitrate being conducted in the same manner as above described.

*Second process.*—The chloride of lead, after being washed, is mixed with an equivalent portion of oxide of magnesium (magnesia) and water, and boiled in a vessel provided with an agitator. The oxygen of the magnesium passes to the lead, forming oxide of lead, while the chlorine of the lead passes to the magnesium, forming chloride of magnesium, this latter remaining in solution, the lead-oxide being precipitated.

*Third process.*—The solution of chloride of magnesium is transferred to a clay retort and distilled, said retort being provided with a proper condensing apparatus. Decomposition of the water and chloride of magnesium takes place at elevated temperatures, forming muriatic acid and oxide of magnesium. The muriatic acid is prepared for the market and the magnesia retained for the decomposition of subsequent productions of chloride of lead.

*Fourth process.*—I mix simple equivalents (or any proportion which will form a soluble silicate) of nitrate of soda (produced by the decomposition of the chloride of sodium with nitrate of lead) with silicic acid (sand) and flux or fuse same in clay retort or glass-house pot provided with suitable appendages for conducting the expelled nitric acid to a vessel containing the recovered oxide of lead and water, said vessel being provided with an agitator, or made like a rotary to afford the nitric acid an opportunity of intimate contact with the oxide of lead. This is done to form nitrate of lead to be used in the decomposition of new quantities of chloride of sodium.

*Fifth process.*—Soluble silicate of soda remains in the retort or pot, and may be with- A. BALDING.
Evaporating Pan.

No. 57,459.

Patented Aug. 28, 1866.

Witnesses:
W. F. Heall
James L. Ervin.

Inventor:
A. Balding
By Munn & Co.
Attorneys.